Nov. 6, 1956  S. J. STEIN ET AL  2,769,944
CAPACITOR
Filed Aug. 18, 1953  2 Sheets-Sheet 1
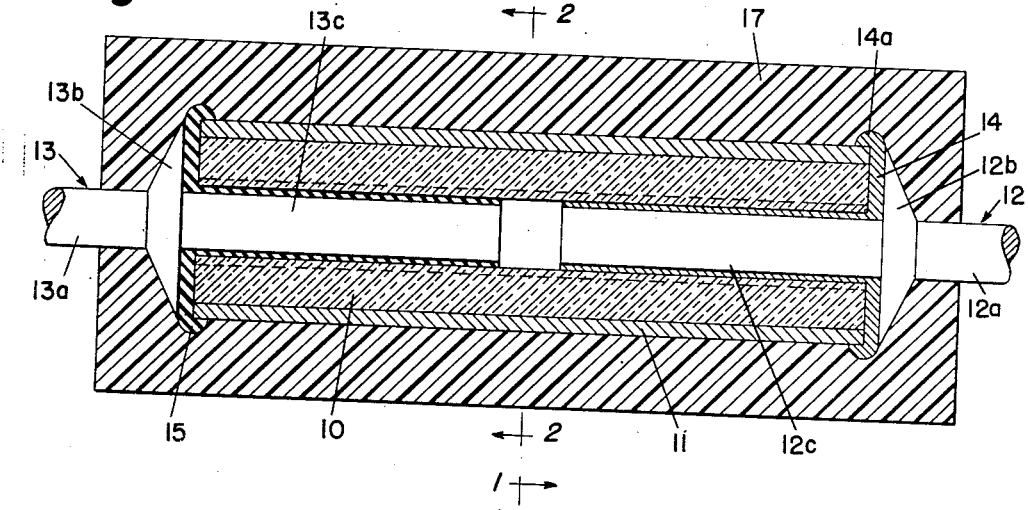
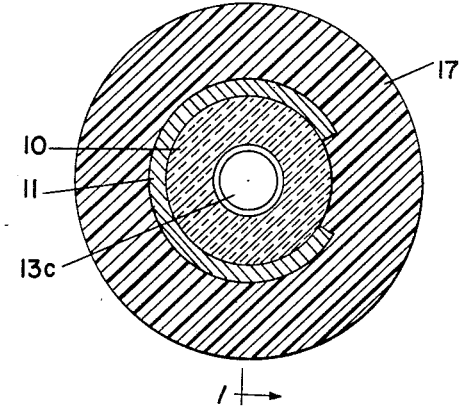
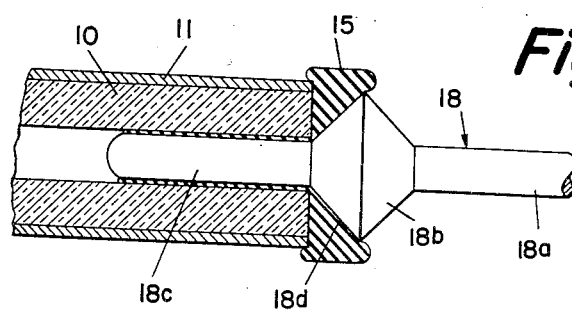
INVENTORS.
SIDNEY J. STEIN
ALEXANDER L. PUGH, JR.
BY *Donald S. Cohen*
ATTORNEY Nov. 6, 1956  S. J. STEIN ET AL  2,769,944
CAPACITOR Filed Aug. 18, 1953  2 Sheets-Sheet 2

INVENTORS.
SIDNEY J. STEIN
ALEXANDER L. PUGH, JR.

BY Donald S. Cohen
ATTORNEY

2,769,944

CAPACITOR

Sidney J. Stein, Philadelphia, and Alexander L. Pugh, Jr., Bala-Cynwyd, Pa., assignors to International Resistance Company, Philadelphia, Pa., a corporation of Delaware Application August 18, 1953, Serial No. 375,004

4 Claims. (Cl. 317—242)

This invention relates to an improvement in the construction of a capacitor which can be made in small sizes and the capacitor element which is easily manufactured by a continuous operation.

Heretofore capacitors have been made by coating the inner and outer surfaces of a tube of dielectric material with a film of conductive material and attaching a terminal to each of the films. The two films act as the conductive plates of the capacitor and the capacitance is varied by changing the length of overlap of the films. Usually the inner film extends over one end of the tube and overlaps the outer surface of the tube but is spaced from the film on the outer surface, so that one terminal may be easily attached to the inner film. A disadvantage to this type of construction is that in making small size capacitors it is difficult to coat the inner surface of the tube to form the inner conducting surface.

It is therefore an object of this invention to provide a capacitor of simpler construction in which a conductive film is applied to only the outer surface of a tube of dielectric material so that it can be easily made in small sizes. Another object is to provide a capacitor the tubular element of which can be easily manufactured by a continuous operation.

The invention accordingly consists in the features of construction, combinations of elements, and arrangements of parts as will be exemplified in the structure to be hereinafter described and the scope of the application of which will be indicated in the following claims.

In the accompanying drawings in which is shown three of the various possible embodiments of this invention:

Figure 1 is an axial sectional view, with parts shown in side elevation and broken away, of one form of the capacitor taken along the line 1—1 of Figure 2;

Figure 2 is a transverse sectional view of the capacitor of Figure 1 taken along the line 2—2 of Figure 1;

Figure 3 is a modified form of the terminal member;

Figure 4:
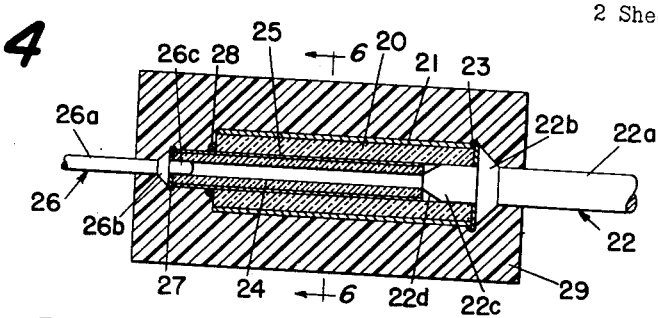
Figure 4 is a sectional view similar to Fig. 1 of a modified form of the capacitor taken along the line 4—4 of Figure 6.

Referring to the drawings, in which like numerals identify similar parts, it will be seen from Figures 1 and 2 that one form of the capacitor comprises a tube 10 of a dielectric material, such as glass having a conductor 11 in the form of a film of conductive material coated on its outer surface from end to end thereof. The glass tube may be of any desired diameter and can be made as small as about 1/16 inch to provide a very small unit. The film 11 of conductive material may extend entirely around the circumference of the tube 10 or, as shown in Figure 2, only partially therearound. The conductive material may be carbon, graphite or any suitable conducting metal, such as silver or nickel, with or without a binding material. Held or attached to opposite ends of the tube 10 are terminal members 12 and 13 of conducting material. Each terminal member comprises a lead portion 12a or 13a, an annular flange 12b or 13b extending radially from the lead portion, and an extension or core portion 12c or 13c.

The extensions or core portions 12c and 13c of the terminal members project into the opposite ends of the bore of tube 10 but are axially spaced from each other. The annular flanges 12b and 13b are juxtaposed to the ends of the tube 10 and have an outer diameter preferably substantially the same as the outer diameter of the tube. The terminal member 12 is attached or bonded to the tube 10 by a layer of cement 14 of conductive material which preferably extends between the core portion 12c and the bore wall as well as between the annular flange 12b and the end of the tube. The conductive cement 14 overlaps an end of the conductor film 11 at 14a thus electrically connecting the terminal 12 to the conductive material. The terminal member 13 is attached or bonded to the tube 10 by a layer of cement 15 of dielectric material which also preferably extends between the core portion 13c and the bore wall as well as between the annular flange 13b and the end of the tube. The dielectric cement 15 also preferably overlaps the end of the other end of the conductor film 11 so that the terminal 13 is insulated efficiently from the conductive material. Thus the electrically conductive outer surfaces of core portion 13c of the terminal member 13 is the second conductor of the Figs. 1 and 2 capacitor.

The capacitance of this capacitor may be varied by either varying the extent the core portion 13c, the second conductor, projects into tube 10 or by varying the circumferential extent around the tube of the film of conductive material 11, the first conductor. Since in making the capacitor it is cheaper to use duplicate terminal members for all sizes of the capacitor, the preferred method of varying the capacitance is by varying the circumferential extent of the film of conductive material 11 around the tube 10. The assembly may be molded into a protective covering 17 of any well known insulating material leaving the leads 12a and 13a extending therefrom, and such covering may supplement the terminals holding and anchoring functions of the cements or in some equivalent embodiments serve that purpose chiefly.

Since the tube 10 is only coated on its outer surface the capacitor element can be easily manufactured by a continuous operation. The tube 10 which may be as small as 1/16 inch in diameter is drawn in the form of a continuous length hollow filament from a larger diameter tube. After the continuous length filament is drawn it passes through a coating chamber where the film of conductive material 11 is applied to the outer surface of the filament along its entire length. The coating may be done by any well known means such as dipping, painting, spraying, or by depositing the conductive film by any well known method such as vacuum evaporation, pyrolysis, decomposition, or electroplating. The coated filament is then cut into the desired lengths and the terminals 12 and 13 are attached to the ends of each of the cut off lengths 10, one with a conductive cement 14 and the other with an insulating cement 15. By using an excess amount of each of the cements, as the core portions 12c and 13c of the terminals are inserted into the tube the excess cement will be forced along the inner faces of the flanges 12b and 13b and out onto the coating of conductive material 11.

Thus the one terminal 12 will be electrically connected to the coating while the other terminal 13 will be insulated from the coating. The unit may then be molded in the insulating protective covering 17.

Figure 3 shows a modification of the insulated terminal member 13 used in the capacitor of Figures 1 and 2. This terminal member 18 is similar to terminal member 13 in that it comprises a lead portion 18a, an annular flange 18b and an extension or core portion 18c, but differs from terminal member 13 in the shape of the flange. The inner surface of the flange 13b which faces the end of the tube 10 is flat while the corresponding inner surface 18d of flange 18b is conical and flares away from the end of the tube from its bore edge toward its outer edge. This modification provides a greater space between the insulated terminal member 18, which is the second conductor of the capacitor, and the film of conductive material 11, which is the first conductor, this space being filled with the dielectric cement 15 to increase the voltage breakdown of the capacitor. This modified terminal member 18 may also be used in place of terminal member 12, which is electrically connected to the film of conductive material 11, but it is not preferred since it is desired to have the terminal 12 as close as possible to the conductive film to provide efficient electrical connection therebetween.

Figure 5:
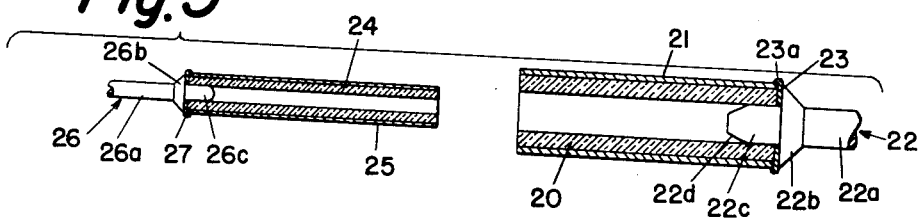
Figure 5 is an exploded view of the sub-assemblies of the capacitor of Figure 4.
Figure 6:
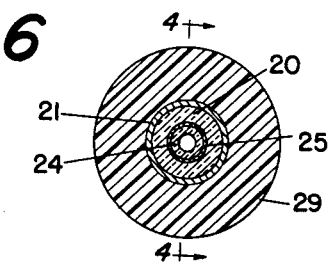
Figure 6 is a transverse sectional view of the capacitor of Figure 4 taken along the line 6—6 of Figure 4.

Figures 4, 5 and 6 show a modification of the capacitor which is similar to the capacitor shown in Figures 1 and 2 except for the construction of the second conductor and the physical size of the completed unit. This modification comprises a tube 20 of a dielectric material, such as glass, having a conductor 21 in the form of a film of conductive material coated on its outer surface from end to end thereof. A terminal member 22 of conducting material is attached to one end of the tube 20. The terminal member 22 comprises a lead portion 22a, an annular flange 22b extending radially from the lead portion, and an extension or core portion 22c. The core portion 22c of the terminal member 22 projects into the tube 20 and has a conical end 22d and the annular flange 22b is juxtaposed to the end of the tube 20. The terminal member 22 is attached to the tube 20 by a cement 23 of conductive material which preferably extends between the core portion 22c and tube bore wall as well as between the annular flange 22b and the end of the tube. The conductive cement 23 overlaps the film 21 of conductive material 23a so as to electrically connect the terminal member 22 to the film of conductive material. The second conductor comprises a second extension in the form of tube 24 of dielectric material, such as glass, having a film of conductive material 25 coated on its outer surface from end to end thereof to constitute outer surface of this extension. The outer diameter of the film of conductive material 25 on the second tube 24 is substantially the same as and preferably slightly less than the inner diameter of the first tube 20. A second terminal member 26, comprising a lead portion 26a, an annular flange 26b which is juxtaposed to one end of tube 24, is attached to the tube 24 by a cement 27 of conductive material which overlaps the film of conductive material 25 to electrically connect this terminal to this film. The open end of the coated second tube 24 constituting the second conductor extension is inserted into the open end of the first tube 20 preferably until the leading end of tube 24 abuts against the end of core portion 22c of terminal member 22. The end of core portion 22c preferably is reduced in diameter such as by being tapered at 22d so that it will not contact the film of conductive material 25 on tube 24, which function, however, may be served by an interposed body of insulation, for example a dielectric body in powder or rod form, such as an insulating slug loosely received in the bore. Tube 24 preferably is held within tube 20 by cement at 28 of insulating material extending between the free end of tube 20 and the coated tube 24. The assembly may be molded into a protective covering 29 of any well known insulating material leaving the leads 22a and 26a extending therefrom, and such covering may serve the function of the cement at 28. The capacitance of this capacitor can be varied by varying the area of overlap between the two conductive films 21 and 25 by varying the length of the outer tube 20, or by varying the circumferential extent of the conductive films around the tubes, or by the extent of telescope of extension 24 in tube 20 as may be dictated by the length of core portion 22c or that of an interposed body of insulation. Since tube 20 receives the second tube 24 its internal diameter must be larger than the outer diameter of the tube 24 which may be the size of tube 10 in Figure 1. Therefore the smallest overall size of the capacitor of this modification which can be made will be larger than that of the capacitor shown in Figure 1.

The method of making this capacitor is similar to that of the capacitor shown in Figures 1 and 2. Each tube is drawn to its proper diameter from a larger tube as a continuous filament. The tubes are coated by any one of the methods previously described. The coated tubes are then cut into the desired lengths 20 and 24 and the proper terminal members 22 and 26 attached thereto. The smaller tube 24 is then inserted into the larger tube 20 and held therein such as by being attached thereto by the insulating cement 28. If desired the assembly may then be molded into the protective covering 29.

Figure 8:
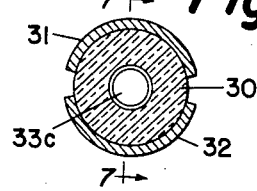
Figure 8 is a transverse sectional view of the capacitor of Figure 7 taken along line 8—8 of Figure 7.
Figure 7:
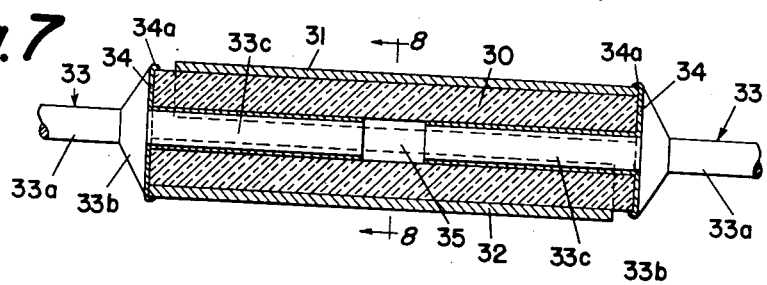
Figure 7 is a sectional view similar to Figs. 1 and 4 of a second modification of the capacitor taken along the line 7—7 of Figure 8.
Figure 9:
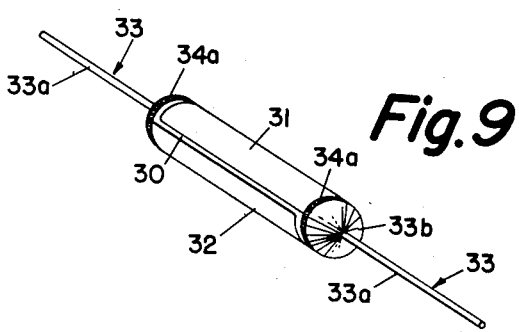
Figure 9 is a perspective view of the capacitor of Figure 7.

Figures 7, 8 and 9 show another modification of the capacitor. This modification comprises a tube 30 of dielectric material, such as glass, having a pair of spaced conductors 31 and 32 in the form of films of conductive material coated on the outer surface of the tube. As can be seen in Figure 8 each of conductors 31 and 32 extends only partially around the circumference of the tube 30 so that the conductors are spaced apart. One conductor film 31 preferably extends from one end of the tube 30 to a point spaced from the other end of the tube. The other conductor 32 extends from the other end of the tube 30 to a point spaced from the first end of the tube. A pair of electrically conductive terminal members 33 are attached to opposite ends of the tube 30. Each terminal member comprises a lead portion 33a, an annular flange 33b juxtaposed to one end of the tube, and a core portion 33c projecting into the tube core. Each terminal member 33 is attached to its respective end of the tube 30 by a body of cement 34 of conductive material which preferably extends between the core portion 33c and the bore wall as well as between flange 33b and the tube end. Each body of the conductive cement 34 overlaps at 34a one end of the outer surface of the tube and the conductor film which extends to that end. Thus the conductor film 31 is electrically connected to one of the pair of terminal members 33, 33 and the other conductor film 32 is connected to the other terminal member. The space 35 between the ends of the core portions 33c may be filled with a dielectric material in rod or powder form to prevent breakdown between the terminal members. This capacitor may also be molded in a protective covering of an insulating material if desired. The capacitance of this capacitor can be varied either by varying the length of the conductors or by varying the circumferential extent of the conductors around the tube or by both means.

In use of the capacitor of Figs. 7, 8 and 9 the capacity developed between the opposed pair of curved conductor film strips 31 and 32 is supplemented by capacities developed between the overlapped portions of the conductor 31 and the conductive outer surface of the extension provided by core portion 33c of the terminal member 33 connected to conductor 32, and between the overlapped portions of the latter conductor and the conductive outer surface of the core portion of the other terminal member connected to conductor 31. Thus this embodiment virtually constitutes a duplication in one construction of the combination of the basic capacitor elements of the Figs. 1 and 2 embodiment. Each of the two duplicated combinations of capacitor elements comprises a tube of insulating material having as one conductor a curved strip of conductive film thereon connected to a terminal lead provided with an extension projecting into one end of the tube bore, and as the other conductor the conductive outer surface of a second terminal lead extension slidably received in the other end of the tube bore. The functions of those terminal parts are reversed in the second like combination with respect to the other curved film strip which constitutes an element in this second combination. In addition, there is cooperative capacity functioning of elements of both combinations as indicated above. Accordingly, the capacitance of this embodiment further may be varied by varying the extent of the overlappings of the curved conductor films 31 and 32 with respect to the conductive surfaces of the bore-received extensions 33c and 33c.

The capacitor of Figs. 7, 8 and 9 can be made by drawing the tube 30 to its desired diameter from a larger diameter tube as a continuous hollow filament and coating the outer surface of the tube by any of the methods previously described. The two film conductors 31 and 32 can be formed by either coating two spaced films of the conductive material on the filament or by coating the whole surface of the filament and passing it between diametrically opposed scrapers or grinders which remove a strip of the coating from opposite sides of the tube. The tube is then cut into the desired lengths and a portion of one of the conductor films is scraped or ground off of one end of the tube 30, and a similar portion of the other conductor film is similarly removed from the opposite end of the tube. The terminal members 33, 33 are then attached to the ends of the coated tube 30 by the bodies of conductive cement 34. If desired, the unit may be molded into a protective covering leaving the leads extending therefrom.

It will thus be seen that there has been provided capacitors of simple construction which can be easily made in small sizes. Not only are the resulting structures simple in construction but they permit practice of a simple and effective continuous method of making the capacitor elements which assures a marked economy in manufacture.

As many possible embodiments may be made of the above invention and as many changes might be made in the embodiments set forth, it is to be understood that all matter hereinbefore set forth, or shown in the accompanying drawings, is to be interpreted as illustrative and not in a limiting sense.

We claim:

1. A capacitor comprising, in combination, a tube of dielectric material, a conductor in the form of a film of conductive material on the outer surface of said tube, and a pair of substantially like terminal leads having axially spaced extensions projecting into opposite ends of said tube and lateral flanges juxtaposed to the opposite ends of said tube, the surfaces of said flanges which face the ends of said tube tapering away from the tube from a point adjacent their inner edges toward their outer edge.

2. A capacitor comprising, in combination, a tube of dielectric material, a conductor in the form of a film of conductive material on the outer surface of said tube, and a pair of terminal leads having axially spaced extensions projecting into opposite ends of said tube and lateral flanges juxtaposed to the opposite ends of said tube, the flange on one of said leads having its surface which faces the end of the tube tapering away from the tube from its inner edge toward its outer edge, the flange on said one lead being anchored to said tube by interposed dielectric cement and the flange of the other of said leads being anchored to said tube by interposed conductive cement having electrical contact with said film.

3. A capacitor comprising, in combination, a tube of dielectric material, a conductor in the form a film of conductive material on the outer surface of said tube, and a pair of substantially like terminal leads having axially spaced extensions projecting into opposite ends of said tube and lateral flanges juxtaposed to the opposite ends of said tube and having their surfaces which face the ends of the tube tapering away from the tube from their inner edges toward their outer edges, the flange of one of said leads being anchored to said tube by interposed dielectric cement and the flange of the other of said leads being anchored to said tube by interposed conductive cement having electrical contact with said film.

4. A capacitor comprising in combination a tube of dielectric material, a conductor in the form of a film of conductive material on the outer surface of said tube and extending from end-to-end thereof, a pair of substantially like terminal leads having axially spaced extensions projecting into opposite ends of said tube and lateral flanges juxtaposed to the opposite ends of said tube, and dielectric cement interposed between the flange of one of said leads and the adjacent end of the tube anchoring said flange to the tube and insulating said flange from said film, the flange of the other of said leads being anchored to said tube by interposed conductive cement electrically connected to said film.

References Cited in the file of this patent

UNITED STATES PATENTS

| 2,270,953 | Manz | Jan. 27, 1942 |
| 2,398,088 | Ehlers | Apr. 9, 1946 |
| 2,702,878 | Heibel | Feb. 22, 1955 |

FOREIGN PATENTS

| 583,493 | Great Britain | Dec. 19, 1946 |
| 590,753 | France | Mar. 25, 1925 |
| 813,823 | France | Mar. 1, 1937 |